United States Patent [19]

Kawazoe et al.

[11] Patent Number: 4,808,866
[45] Date of Patent: Feb. 28, 1989

[54] VEHICLE GENERATOR WITH SHORT-CIRCUIT DAMAGE PREVENTION

[75] Inventors: Takashi Kawazoe; Kiyoshi Tsuchiya; Hideyuki Ioka, all of Kiryu, Japan

[73] Assignee: Mitsuba Electric Manufacturing Co., Ltd., Gunma, Japan

[21] Appl. No.: 82,590

[22] Filed: Aug. 7, 1987

[30] Foreign Application Priority Data

Aug. 7, 1986 [JP] Japan .................. 61-185894

[51] Int. Cl.⁴ ................... H02K 13/04; H02K 23/26
[52] U.S. Cl. ................... 310/68 D; 310/71; 310/208; 322/28; 363/89; 363/126
[58] Field of Search ........ 310/68 D, 71, 208; 322/28, 64, 68, 72, 73; 363/89, 126, 145

[56] References Cited

U.S. PATENT DOCUMENTS

| | | | |
|---|---|---|---|
| 3,538,362 | 11/1970 | Cheetham et al. | 310/68 D |
| 4,293,811 | 10/1981 | Muto et al. | 322/73 |
| 4,424,464 | 1/1984 | Ikegami | 310/68 D |
| 4,468,580 | 8/1984 | Sasaki et al. | 310/237 |
| 4,500,828 | 2/1985 | Nishihara | 322/28 |
| 4,670,704 | 6/1987 | Maehara et al. | 322/28 |
| 4,716,355 | 12/1987 | Morishita et al. | 322/73 |

FOREIGN PATENT DOCUMENTS

| | | |
|---|---|---|
| 1453284 | 10/1976 | United Kingdom . |
| 1579457 | 11/1980 | United Kingdom . |
| 2048591 | 12/1980 | United Kingdom . |
| 2164508 | 3/1986 | United Kingdom . |

Primary Examiner—Patrick R. Salce
Assistant Examiner—D. L. Rebsch
Attorney, Agent, or Firm—Parkhurst, Oliff & Berridge

[57] ABSTRACT

A vehicle generator is arranged so as to avoid battery overcharging and damage to electronic components caused by short-circuiting of the rotor coil. The rotor coil is wound around the coil bobbin such that the initial winding end of the rotor coil is connected with the regulator, while the final winding end of the rotor coil is connected directly with the battery. Tie parts formed on the edge of the coil bobbin and lug ends formed on the slip ring assembly are correspondingly distinguishably formed, to ensure proper connection of the initial and final winding ends of the rotor coil.

3 Claims, 4 Drawing Sheets

VEHICLE GENERATOR WITH SHORT-CIRCUIT DAMAGE PREVENTION

BACKGROUND OF THE INVENTION

The present invention relates to a vehicle generator mounted on a vehicle such as a passenger car, bus, truck, motor cycle, etc.

A vehicle generator of this type has in general a rotor coil, which is wound around a rotor and connected with both sides of a battery, and a regulator. However, such a rotor coil interferes with rotor poles and is rubbed with a coil bobbin at its final winding end portion, and hence is short-circuited. Once the regulator side is short-circuited, the regulator becomes unlikely to perform its normal function and permits an excitation current to be conducted without limitation, whereby a battery mounted on a vehicle is continuously charged and thus over-charged. However, recent vehicles of all sorts frequently employ electronic equipment equipped with electronic parts such as IC's and the like, and accordingly the overcharged battery causes those electronic parts to be destroyed. Thus, a problem merely associated with the rotor coil causes damage in the electronic equipment having the electronic parts.

SUMMARY OF THE INVENTION

In view of the drawbacks with the conventional vehicle generators, it is an object of the present invention to provide a vehicle generator capable of eliminating those drawbacks. To achieve the above object of the present invention, a vehicle generator is adapted so that a rotor coil wound around a rotor has its initial winding end connected with a regulator and its final winding end connected with a battery.

The present invention thereby securely protects electronic equipment from damage by limiting problems experienced by the short-circuited rotor coil to the battery.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

In what follows, an embodiment of a vehicle generator of the present invention will be described with reference to the accompanying drawings.

Figure 1:
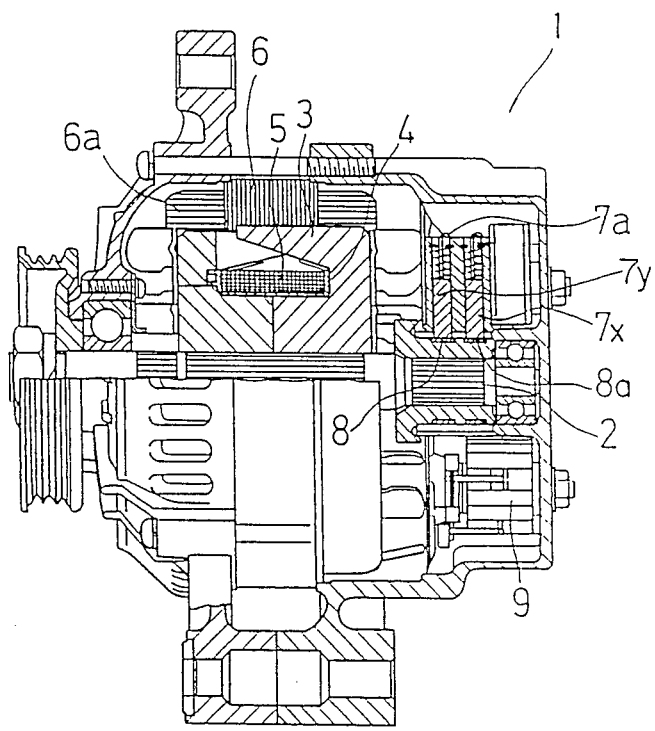
FIG. 1 is a side elevational view, partly cut away, illustrating an embodiment of a vehicle generator according to the present invention.
Figure 2:
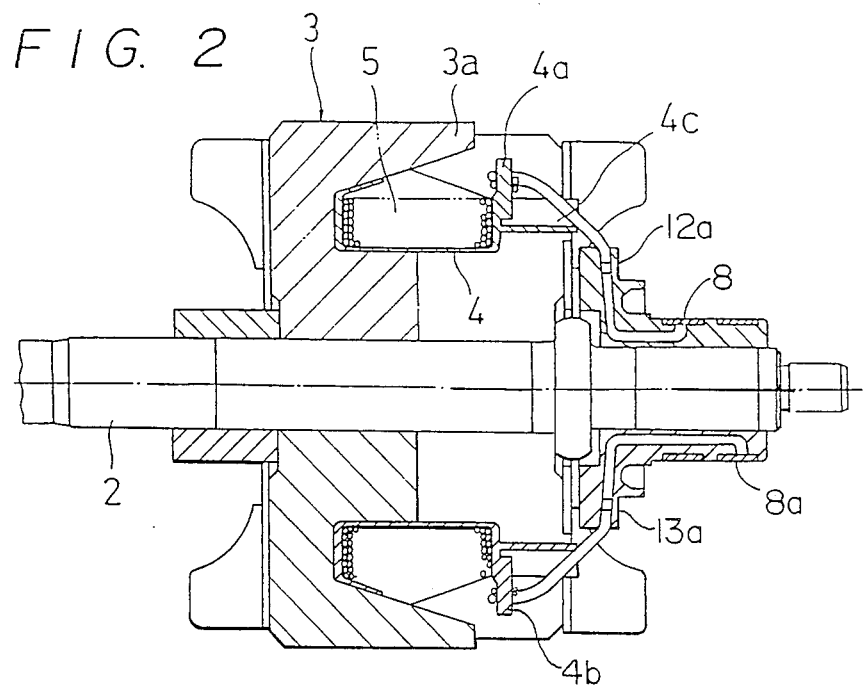
FIG. 2 is a side elevational view, partly cut away, illustrating a core part.
Figure 3:
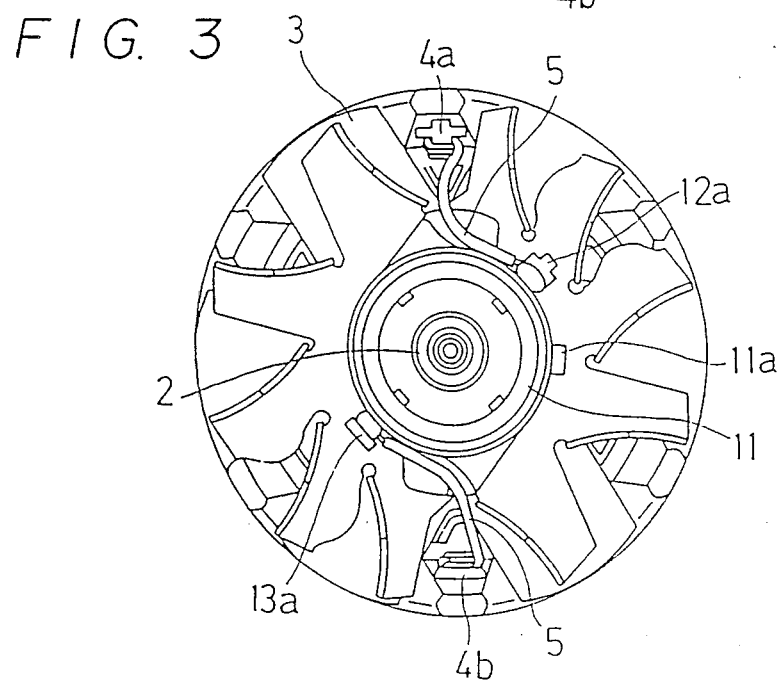
FIG. 3 is a front view illustrating the core part of FIG. 2.
Figure 4:
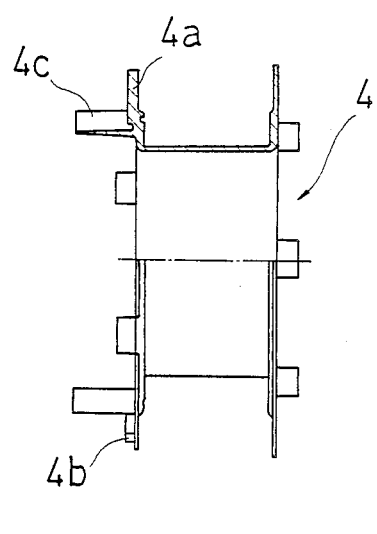
FIG. 4 is a side elevational view illustrating a coil bobbin.
Figure 5:
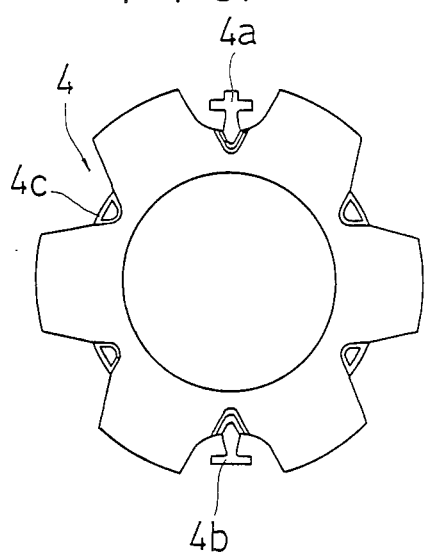
FIG. 5 is a front view illustrating the coil bobbin of FIG. 4.
Figure 6:
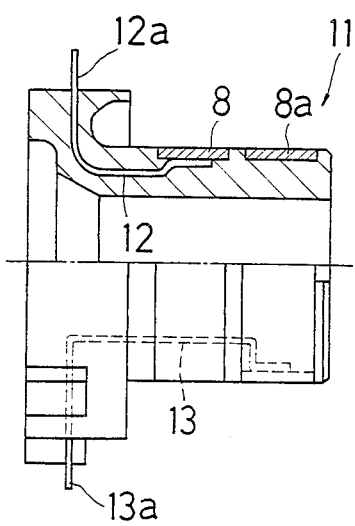
FIG. 6 is a side elevational view, partly cut away, illustrating a slip ring assembly.
Figure 7:
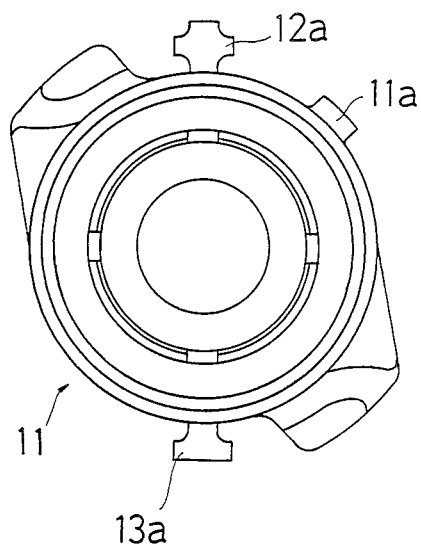
FIG. 7 is a front view of the slip ring assembly of FIG. 6.
Figure 8:
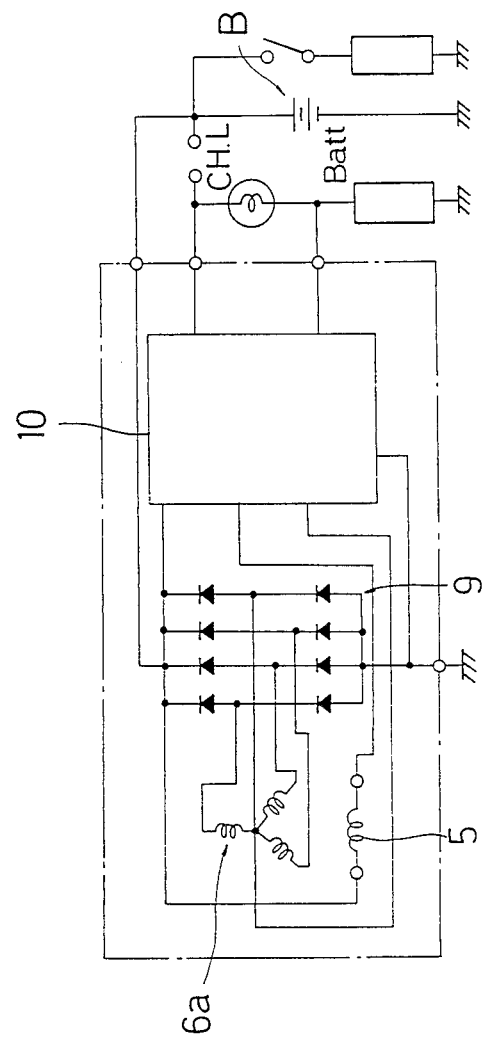
FIG. 8 is a circuit block diagram of the vehicle generator.

As shown in FIGS. 1 to 8, designated at 1 is a vehicle generator, the vehicle generator 1 including, as conventional, a rotor core (field core) 3 into which a core shaft 2 is pushed and fixedly mounted thereon, a coil bobbin 4 packaged in the rotor core 3, a rotor coil 5 described later and wound around the coil bobbin 4, a stator 6 around which a stator coil 6a is wound, brushes 7x, 7y resiliently housed in brush holders, slip rings 8, 8a each slidably making contact with a brush 7x, 7y, a rectifier 9 for rectifying an alternating current (AC) generated, and a regulator 10 set to force the rectified direct current (DC) to flow to a battery B when the battery B is charged to less than its prescribed capacity, or to flow to ground when the battery B is charged to or beyond its prescribed capacity.

The aforementioned coil bobbin 4 includes flanges on both sides thereof, projections 4c projecting from one of said flanges for engagement with the rotor core 3 between poles thereof. "+" and "−" shaped tie parts 4a and 4b are integrally formed on arbitrary ones of the projections 4c. The rotor coil 5 is wound around the coil bobbin 4 by starting to wind the coil 5 such that one end of the coil 5, its initial winding end, is tied to the "−" shaped tie part 4b and the other end of the coil 5, its final winding end, is tied to the "+" shaped tie part 4a. Thereupon, the winding interval of the rotor coil 5 is set such that a final position of the winding of the coil 5 is located in close vicinity to the flange portion on the side of the formation of the tie parts, which is accomplished by, in a final stage winding layer (outermost layer) for example, adjusting the winding interval thereof. This eliminates any slack of the rotor coil 5 and prevents the rotor coil 5 from interfering with the rotor pole parts 3a. In such a manner, winding of the rotor coil 5 around the coil bobbin 4 is finished by tying the final winding end of the coil 5 to the "+" shaped tie part 4a. Thus, the coil bobbin 4, around which the rotor coil 5 has been wound, is pushed onto the core shaft 2 for assembly, such that the projections 4c project from and are sandwiched between the poles of rotor core 3.

On the outer periphery of ring assembly 11 a pair of slip rings 8, 8a are annularly formed, from which lugs 12, 13 project to correspond to the tie parts 4a, 4b, on which ends the "+"and "−" shaped portions are formed respectively. The ring assembly 11 is pushed onto the core shaft 2 and positioned by means of projection 11a such that the "+" and "−" shaped portions 12a, 13a correspond to the respective tie parts 4a, 4b. In this situation, the ends of rotor coil 5 are welded respectively to the foregoing "+" and "−" shaped portions 12a and 13a to thereby permit the initial and final winding end portions of the rotor coil 5 to be securely connected with the slip rings 8, 8a. Thereupon, the slip ring 8 on the side of the "+" shaped part 12a is connected with the battery B via one of the brushes 7y, while the slip ring 8a on the side of the "−" shaped part 13a is connected with the collector of a transistor in the regulator 10 via the other of the brushes 7x.

In the embodiment of the vehicle generator of the present invention arranged as described above, an AC is generated by rotation of the rotor caused by engine drive, and the AC is in turn rectified to a DC by the rectifier 9. The DC is forced to flow to the battery B by operation of the regulator 10 to charge the battery B when the battery B is charged to less than its prescribed capacity, while not serving to charge the battery B when it is charged to or beyond its prescribed capacity.

In the present invention as described above, the battery is charged to the prescribed capacity by the generator 1, but since the final winding end of the rotor coil 5 is adapted to be connected with the battery B, a problem in the rotor coil 5 results in the battery being short-circuited when the rotor coil 5 is short-circuited, and thus the battery B is not over-charged. In other words, the rotor coil 5 may be short-circuited owing to its interference with pole parts 3a and its undesirable contact with the coil bobbin 4 and the slip ring assembly 11, etc., but those portions of the rotor coil 5 are connected to the final winding end thereof. Thus, since in the present invention the final winding end of the rotor coil is connected with the battery B, a problem in the vehicle generator causing short-circuiting as described above results in short-circuiting of the battery without fail. When the battery is short-circuited in such a way, an overcurrent is forced to flow through the generator 1, which causes pigtails 7a extending from the brushes 7x, 7y to be fused to immediately interrupt power generation. The battery B, as a result, is never overcharged, unlike the case where the regulator 10 is short-circuited. Accordingly, electronic parts such as IC's can be securely prevented from being damaged owing to an overcurrent, to protect such parts without fail, as well as to permit consistent resolution of any problem upon occurrence thereof.

In addition, in order to connect the final winding end of the rotor coil 5 with the battery B, in the present embodiment the ring assembly 11 may be assembled so as to permit positioning of parts 4a and 12a, and 4b and 13a, in common within the coil bobbin 4 and the slip ring assembly 11, so as to correspond to one another, whereby the final winding end of the rotor coil can be perfectly prevented from being erroneously connected with the regulator side 10, to conveniently ensure high reliability of products. Furthermore, provided interruption of power generation is displayed for monitoring, an operator can immediately recognize the occurrence of any trouble.

According to the present invention, as described above, the final winding end of the rotor coil is adapted to be connected with the battery. Accordingly, a problem in the vehicle generator causing short-circuiting (e.g., when the rotor coil is short-circuited owing to its interference with the rotor pole parts) is indicated as short-circuiting in the battery, and hence an overcurrent is forced to flow through the vehicle generator to momentarily fuse the pigtails for interruption of power generation. Overcharging of the battery can therefore be securely prevented, thereby avoiding any damage to electronic parts such as IC's.

Although a certain preferred embodiment has been shown and described, it should be understood that changes and modifications may be made therein without departing from the scope of the appended claims.

We claim:

1. A vehicle generator comprising:
    a rotor core;
    a coil bobbin packaged within said rotor core;
    a rotor coil wound around said coil bobbin for permitting a direct current to flow therethrough;
    a stator;
    a stator coil wound around said stator;
    brushes;
    slip rings in contact with said brushes for permitting the direct current to flow;
    a rectifier for rectifying an alternating current generated; and
    a regulator set to force a direct current yielded as a result of said rectification to flow to a battery when said battery is charged to less than its prescribed capacity, while being set to force said direct current to ground when said battery is charged to or beyond its prescribed capacity;
    said rotor coil being wound around said coil bobbin such that an initial winding end of said rotor coil is connected with said regulator while a final winding end of said rotor coil is connected directly with said battery.

2. A vehicle generator comprising:
    a rotor core (3);
    a coil bobbin (4) packaged within said rotor core (3);
    a rotor coil (5) wound around said coil bobbin (4);
    first and second tie parts (4b, 4a) formed on the edge of said coil bobbin (4), initial and final winding ends of said rotor coil (5) being connected respectively to said first and second tie parts;
    a stator;
    a stator coil (6a) wound around said stator;
    a ring assembly (11), comprising a pair of slip rings (8, 8a), pushed into said rotor core (3);
    a rectifier for rectifying an alternating current generated;
    a regulator (10) set to force a direct current yielded as a result of said rectification to flow to a battery (B) when said battery (B) is charged to less than its prescribed capacity;
    a first brush (7x) in contact with one of said slip rings (8a) and connected to said regulator (10);
    a second brush (7y) in contact with the other of said slip rings (8) and connected to said battery (B);
    two differently shaped lug ends (12a, 13a) formed on said slip ring assembly (11) and connected respectively to said slip rings (8, 8a);
    the shape of one lug end (13a) connected to said regulator (10) being distinguishably formed to correspond to said shape of said first tie part (4b) connected to the initial winding end of said rotor coil (5), and the shape of the other lug end (12a) connected to said battery (B) being distinguishably formed to correspond to the shape of said second tie part (4a) connected to the final winding end of said rotor coil (5), such that the initial winding end of said rotor coil (5) is connected with the regulator (10) via said first tie part (4b) and said one lug end (13a), while the final winding end of said rotor coil (5) is connected directly with said battery (B) via said second tie part (4a) and said other lug end (12a).

3. A vehicle generator as claimed in claim 2, wherein said first tie part (4b) and said one lug end (13a) are shaped as a "−", while said second tie part (4a) and said other lug end (12a) are shaped as a "+".

* * * * *